US 8,738,011 B2

(12) United States Patent  
Jeong et al.

(10) Patent No.: US 8,738,011 B2  
(45) Date of Patent: May 27, 2014

(54) MEASUREMENT REPORT METHOD AND APPARATUS IN WIRELESS COMMUNICATION SYSTEM

(75) Inventors: Kyeong In Jeong, Hwaseong-si (KR); Soeng Hun Kim, Suwon-si (KR); Jung Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 12/590,277

(22) Filed: Nov. 4, 2009

(65) Prior Publication Data

US 2010/0113009 A1 May 6, 2010

(30) Foreign Application Priority Data

Nov. 5, 2008 (KR) ........................ 10-2008-0109575

(51) Int. Cl.
*H04W 36/00* (2009.01)
(52) U.S. Cl.
USPC ......................................... 455/444; 455/434
(58) Field of Classification Search
USPC ..................... 455/423, 434–438, 444–446
See application file for complete search history.

(56) References Cited

U.S. PATENT DOCUMENTS

| 6,963,745 | B2 * | 11/2005 | Singh et al. ................... 455/437 |
| 2006/0084390 | A1 * | 4/2006 | Salonaho et al. ........... 455/67.11 |
| 2006/0148485 | A1 | 7/2006 | Kangas et al. |
| 2007/0207822 | A1 | 9/2007 | Andersson et al. |
| 2008/0267153 | A1 * | 10/2008 | Mukherjee et al. ............ 370/338 |
| 2009/0047960 | A1 * | 2/2009 | Gunnarsson et al. .......... 455/436 |
| 2009/0047968 | A1 * | 2/2009 | Gunnarsson et al. .......... 455/446 |
| 2009/0124235 | A1 * | 5/2009 | Bosch et al. .................. 455/411 |
| 2009/0239533 | A1 * | 9/2009 | Somasundaram et al. ..... 455/434 |
| 2010/0069119 | A1 * | 3/2010 | Mueck et al. ................. 455/561 |
| 2010/0298017 | A1 * | 11/2010 | Dalsgaard et al. ............ 455/507 |

OTHER PUBLICATIONS

International Search Report dated Jun. 1, 2010 in connection with International Patent Application No. PCT/KR2009/006460.

* cited by examiner

*Primary Examiner* — Nathan Taylor

(57) ABSTRACT

A measurement report method and apparatus of a user equipment is capable of improving system performance in a wireless communication system in which macro and Closed Subscriber Group (CSG) cells are co-located. An inter-frequency measurement report method of a user equipment in a wireless communication system including macro and Closed Subscriber Group (CSG) cells according to the present invention includes performing measurements for all cells identified by unique Physical Cell Identifiers (PCIs); determining whether at least one cell of which measurement fulfills inter-frequency measurement report events; checking, if at least one cell of which measurement fulfills inter-frequency measurement report events, a type of a best cell among the at least one cell in measurement; and transmitting, if the best cell is a macro cell or an accessible CSG cell, the inter-frequency measurement report to a serving base station.

18 Claims, 5 Drawing Sheets

MEASUREMENT REPORT METHOD AND APPARATUS IN WIRELESS COMMUNICATION SYSTEM

CROSS-REFERENCE TO RELATED APPLICATION(S) AND CLAIM OF PRIORITY

The present application is related to and claims priority to an application entitled "MEASUREMENT REPORT METHOD AND APPARATUS IN WIRELESS COMMUNICATION SYSTEM" filed in the Korean Intellectual Property Office on Nov. 5, 2008 and assigned Ser. No. 10-2008-0109575, the contents of which are incorporated herein by reference.

TECHNICAL FIELD OF THE INVENTION

The present invention relates to wireless communications and, in particular, to a measurement report method and apparatus of a user equipment in a wireless communication system in which macro and Closed Subscriber Group (CSG) cells are co-located.

BACKGROUND OF THE INVENTION

Femto cells are cost-active means of providing ubiquitous connectivity in broadband wireless networks. Femto is a prefix denoting a factor of $10^{-15}$ in the International System of Units. In telecommunications, a femto cell is a tiny cellular base station for use in home or small business. In the meantime, the $3^{rd}$ Generation Project Partnership Long Term Evolution (3GPP LTE) standards specify evolved base stations, i.e., an evolved Node B (eNB) and a home eNB. The eNB corresponds to a normal macro base station and the home eNB corresponds to a femto base station.

FIG. 1 illustrates a sequence diagram for an inter-frequency handover procedure in the conventional wireless communication system.

In FIG. 1, a User Equipment (UE) 201 is operating on a first frequency band F1 within a serving cell under the control of a serving eNB 205. Reference numeral 203 denotes a second frequency band F2, and reference numeral 207 denotes a target eNB controlling a target cell to which the UE 201 to be handed over.

The UE 201 performs Inter-Frequency (hereinafter called as Inter-F) measurement (block 211). At this time, the serving eNB 205 of the UE 201 is operating on the first frequency band (F1), and the Inter-F measurement can be performed on the second frequency band (F2).

The UE 201 transmits a measurement report message to the serving eNB 205, and the measurement report is mainly triggered by two events: first the measurement on a neighbor cell is greater than the measurement of the serving cell over as much as a predetermined parameter value (offset) and, second, the measurement of the neighbor cell is greater than a predetermined threshold. Before starting measurement, the UE 201 can receive the parameter values, such as the offset and the threshold, through a measurement control message transmitted by the serving eNB 205.

If there is no allowed CSG cell and a range of Physical Cell ID (PCI) values reserved for use by valid CSG cells is known, the UE 201 does not performs inter-F measurements on the frequency bands of the PCI values reserved for use by the valid CSG cells. That is, the UE 201 performs the inter-F measurement on second frequency band (F2) of the public/macro cell (hereinafter called as macro cell).

Here, it is assumed that a cell B fulfills the Inter-F measurement report event on the second frequency band (F2) and the cell B is a macro cell on the second frequency band (F2).

Since the cell B fulfills the Inter-F measurement report event, the UE 201 transmits the measurement report message 221 including the frequency, PCI, and measurement about the cell B to the serving eNB 207.

Although the UE 201 has reported the measurement of the cell B, there may be a CSG cell having a good quality as compared to that of the cell B and fulfilling the inter-F measurement report event. For instance, it is assumed that a cell A on the second frequency band (F2) has a channel quality greater than the measurement of the cell B and fulfills the inter-F measurement report event, but is non-allowed CSG cell to access.

The serving eNB 205 received the inter-F measurement report makes a handover decision (block 231) to the cell B on the second frequency band (F2) and prepares the handover (block 233) by exchanging signals with the target eNB 207.

After the completion of the handover preparation, the serving eNB 205 transmits a handover command message 241 to the UE 201 instructing the UE 201 to hand over to the cell B.

Upon receipt of the handover command message, the UE 201 performs the handover (block 251) to the cell B on the second frequency band (F2). However, since the cell A is the best cell having the best radio channel quality, the UE 201 handed over to the cell B is likely to cause the inter-cell interference to other cell on the second frequency band (F2) including the cell A. In order to mitigate the inter-cell interference on the second frequency band (F2), the UE 201 attempts to hand over to the first frequency band (F1) (block 261). This causes the ping-pong effect and increases the signaling and processing overhead due to due to the frequent transmission of frequency measurement reports, resulting in degradation entire system throughput.

SUMMARY OF THE INVENTION

To address the above-discussed deficiencies of the prior art, it is a primary object to provide an inter-frequency measurement report method and apparatus for a wireless communication system that is capable of avoiding ping-pong effect caused by unnecessarily repeated handovers, resulting in improvement of system performance.

In accordance with an exemplary embodiment of the present invention, an inter-frequency measurement report method of a user equipment in a wireless communication system including macro and Closed Subscriber Group (CSG) cells includes performing measurements for all cells identified by unique Physical Cell Identifiers (PCIs); determining whether at least one cell of which measurement fulfills inter-frequency measurement report events; checking, if at least one cell of which measurement fulfills inter-frequency measurement report events, a type of a best cell among the at least one cell in measurement; and transmitting, if the best cell is a macro cell or an accessible CSG cell, the inter-frequency measurement report to a serving base station.

Preferably, the inter-frequency measurement report method further includes determining, if the user equipment has at least one registered CSG cell and the best cell is one of the at least one registered cell and of which PCI is in a range of the PCIs reserved for use by CSG cells, the best cell as the accessible CSG cell.

Preferably, the inter-frequency measurement report method further includes skipping, if the best cell is a non-accessible CSG cell, transmission of the inter-frequency measurement report to the serving cell.

Preferably, the inter-frequency measurement report method further includes determining, if the user equipment has no registered CSG cell and the PCIs of the best cell is out of a range of the PCIs reserved for use by CSG cells, the best cell as the non-accessible CSG cell.

In accordance with another exemplary embodiment of the present invention, an inter-frequency measurement report apparatus of a user equipment in a wireless communication system including macro and Closed Subscribed Group (CSG) cells includes a measurement unit that performs measurements for cells; a measurement controller that controls the measurement unit to measure all cells identified by unique Physical Cell Identifiers; and a message processor that selects a best cell among at least one cell of which measurement fulfills inter-frequency measurement report events, checks a type of the best cell, and generates, when the best cell is a macro cell or an accessible CSG cell, an inter-frequency measurement report message to be transmitted to a serving cell.

Preferably, the message processor determines, if the user equipment has at least one registered CSG cell and the best cell is one of the at least one registered cell and of which PCI is in a range of the PCIs reserved for use by CSG cells, the best cell as the accessible CSG cell.

Preferably, the message processor skips, if the best cell is a non-accessible CSG cell, creation of the inter-frequency measurement report message.

Preferably, the message processor determines, if the user equipment has no registered CSG cell and the PCIs of the best cell is out of a range of the PCIs reserved for use by CSG cells, the best cell as the non-accessible CSG cell.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

In the following description, first the wireless communication network architecture for supporting the measurement report method of the present is described. The present invention is directed to a cellular communication system in which macro and CGS cells are co-located.

In the following description, the terms "base station", "BS", "evolved Node B", and "eNB" can be synonymously used. Also, the terms "user equipment", "UE", "mobile station", and "MS" can be synonymously used.

Figure 1:
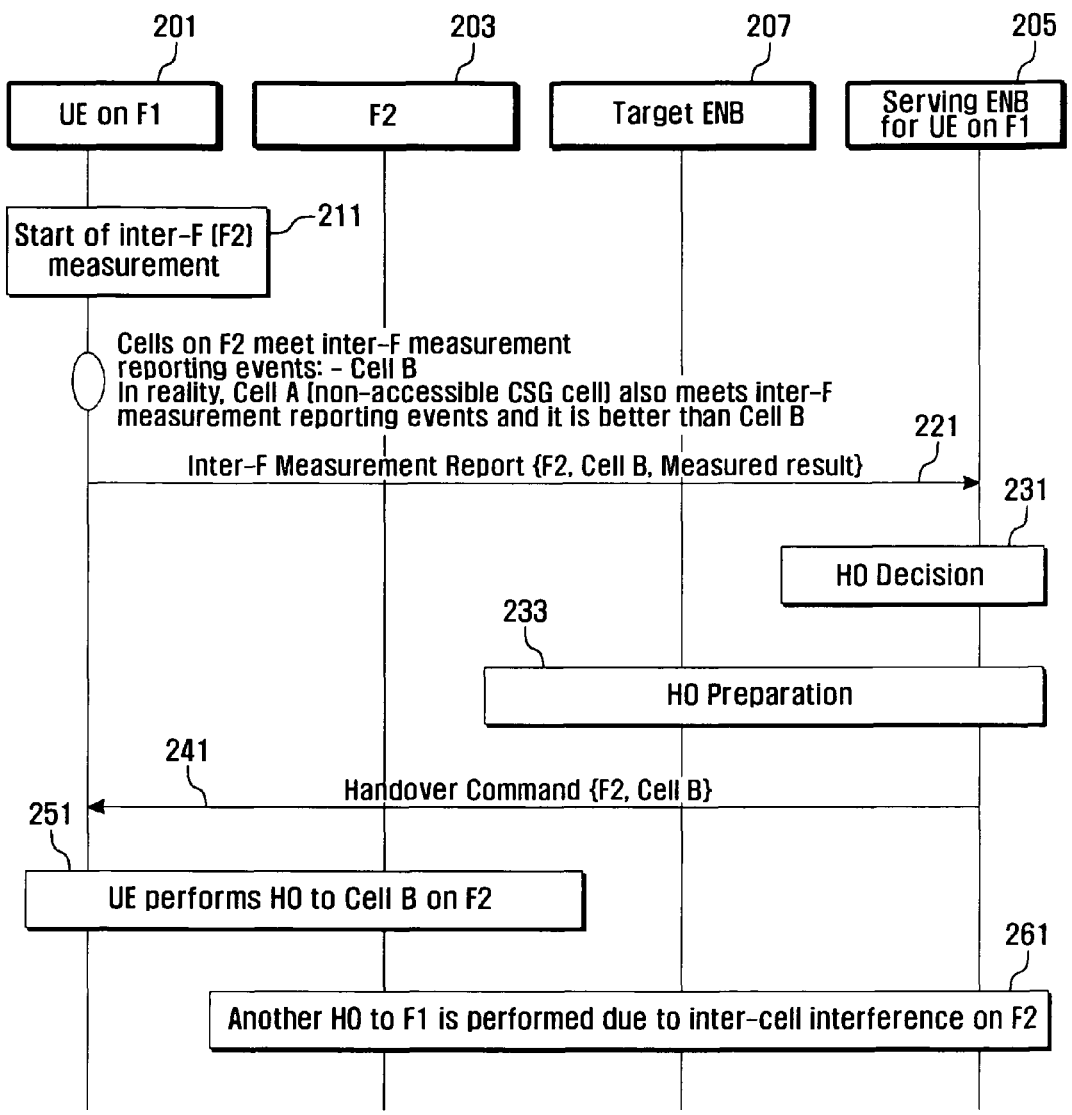
FIG. 1 illustrates a sequence diagram for an inter-frequency handover procedure in the conventional wireless communication system.
Figure 2:
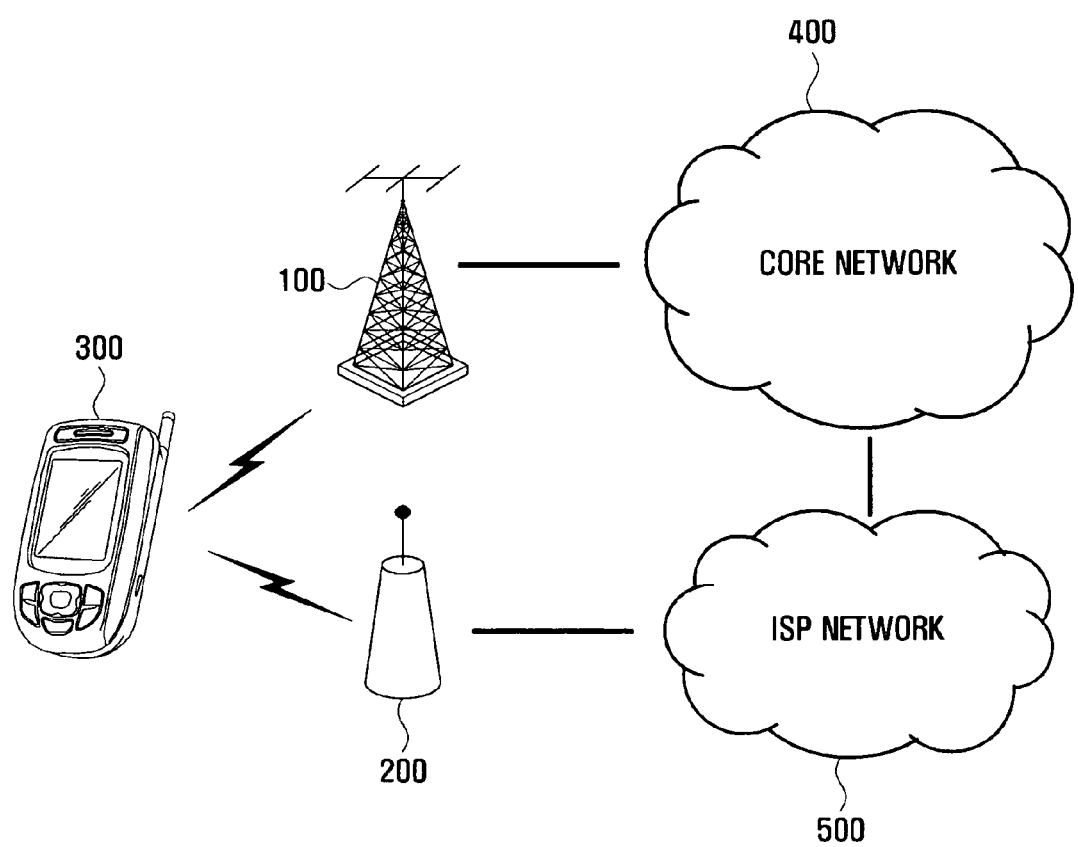
FIG. 2 illustrates a diagram for a wireless communication system for supporting the measurement report method according to an exemplary embodiment of the present invention.
Figure 3:
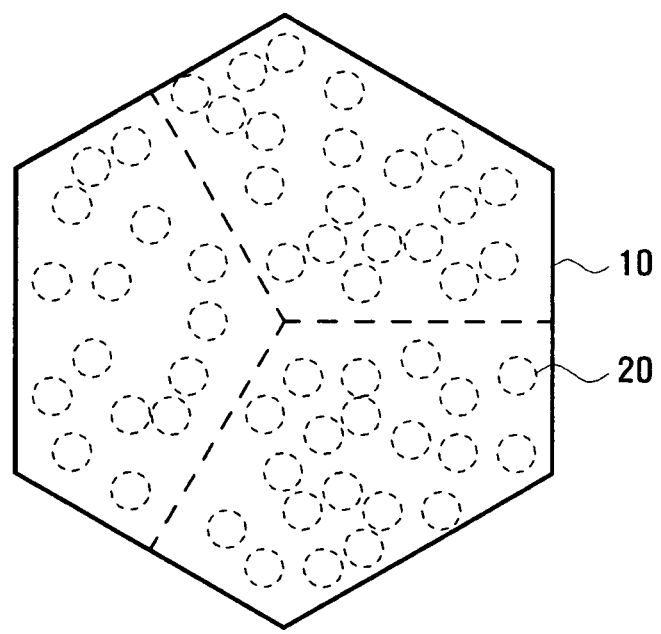
FIG. 3 illustrates a diagram for a cell topology of wireless communication system of FIG. 2.

FIG. 2 illustrates a diagram for a wireless communication system for supporting the measurement report method according to an exemplary embodiment of the present invention, and FIG. 3 illustrates a diagram for a cell topology of wireless communication system of FIG. 2.

As shown in FIG. 2, the wireless communication system includes a Core Network 200, a macro Base Station (macro-BS) 100 connected to the Core Network 200, a CSG-BS 200 connected to the Core Network 200 via an Internet Service Provider (ISP) network 500, and a User Equipment (UE) 300 accessible to both the macro-BS 100 and CSG-BS 200.

In FIG. 3, a plurality of CSG cells 20 are distributed in a macro cell 10. The macro-BS 100 forms the macro cell 10 as a normal cellular communication area. The macro-BS 100 can be a Node B or an evolved Node B (eNB).

The CSG cell 20, or femto cell, is a small communication area as compared to the macro cell 10. The CSG cell 20 is formed by the CSG-BS, or femto-BS, sited inside a subscriber's home or small business. As shown in FIG. 3, a plurality of CSG cell 20 can be deployed within a macro cell 10. Each CSG-BS 200 forms a CSG cell 20 and corresponds to the macro-BS 100 forming a macro cell 10 in functionality. The CSG-BS can be a Node B or an eNB.

The macro-BS 100 provides the functionality that enables the UE 300 to access network service over air interface and manages the radio resources. For instance, the macro-BS 100 generates system information including the control information required for the UE 300 to access network services, allocates radio resources for transmitting and receiving the control information and data to and from the UE 300, and makes a handover of the UE 300 based on the measurements about the serving and neighbor cells. The macro-BS 100 includes protocols such as Radio Resource Protocol (RRC) related to the resource management.

The CSG cell 20 allows a specific group of UEs that are permitted to access the network services except for emergency service such as emergency call, and deployed for covering a small area such as home cell and small business/site network.

Particularly, the CSG cell 20 (or the CSG-BS 200 forming the CSG cell 20) allows the UEs as the registered members to select/access the cell. The CSG cell 20 (or the CSG-BS 200 forming the CSG cell 20) includes the identity information about the registered UEs 300. The identity information can be a white-list.

The UE 300 includes an accessible cell list containing all the CSG identities of the CSG cells to which the UE 300 belongs and can perform search and measurements on the Synchronization Channel (SCH) with the CSG cell ID (synonymously called Physical Cell ID (PCI) or L1 cell ID; hereinafter called as PCI) from the macro or CSG cell. There are '504' unique PCIs, and a range of the PCIs are reserved for the CSG cells per operator.

The user equipment 300 (hereinafter called synonymously with UE) can connect to the core network 400 via the macro-BS 100 or the CSG cell 300 and ISP network 500. The core network can be an Internet Protocol (IP) network.

As described above, the wireless communication system includes the macro and CSG cells.

In an exemplary embodiment of the present invention, the UE 300 can perform the inter-frequency measurements for all the frequency bands of the PCIs including the PCIs reserved for use by the CSG cells to solve the problem of the prior art. In order to achieve the objectives, the inter-frequency measurement report message is transmitted as described in the following.

First, the UE 300 determines whether to report the measurements depending on the type of the best cell among the neighbor cells fulfilling the inter-frequency measurement report events. The best cell means the cell of which the measurement value is the best among those of the neighbor cells as the result of inter-frequency measurements, i.e., the cell of which the received signal strength is greatest among the neighbor cells.

The UE 300 transmits the inter-frequency measurement report to the serving BS only when the best cell is a macro cell or an accessible CSG cell with which the UE 300 is registered. In contrast, when the best cell is a non-accessible CSG cell, the UE 300 does not transmit the inter-frequency measurement report to the serving cell. That is, the UE 300 skips transmission of the inter-frequency measurement report to the serving cell, even though a cell fulfilling the inter-frequency measurement report event exist, if the cell is a non-accessible CSG cell.

Second, it is assumed that there is no accessible CSG cell with which the UE 300 is registered. This is the case where the CSG cell list (white-list) of the UE 300 is empty. In this case, the UE 300 cannot hand over to a CSG cell. Also, it is assumed that the UE 300 knows the range of the PCIs reserved for use by the CSG cells. In this case, the UE 300 transmits the inter-frequency measurement report to the serving cell only when the PCI of the best cell is out of the range of the PCIs reserved for use by the CSG cells.

In case that the PCI of the best cell among the measured cells fulfilling the inter-frequency measurement report events is in the range of the PCIs reserved for use by the CSG cells, the UE 300 does not transmit the inter-frequency measurement report to the serving cell.

If the UE 300 does not know the range of the PCIs reserved for use by the CSG cells, the UE 300 receives the system information of the best cell among the measured cells fulfilling the inter-frequency measurement report events and determines, based on the system information, whether the best cell is CSG cell or not.

Third, it is assumed that at least one accessible cell with which the UE is registered. This is the case where the CSG cell list of the UE 300 contains the corresponding cell (whitelist). Also, it is assumed that the UE 300 knows the range of the PCIs reserved for use by the CSG cells.

In case that the PCI of the best cell among the measured cells on another frequency band (the second frequency band, F2) that fulfill the inter-frequency measurement events is out of the range of the PCIs reserved for use by the CSG cells, the UE 300 transmits the inter-frequency measurement report to the serving cell.

Even in the case that the PCI of the best cell among the measured cells on another frequency band (the second frequency band, F2) and the best call fulfills the inter-frequency measurement events is in the range of the PCIs reserved for use by the CSG cells, the UE 300 transmits the inter-frequency measurement report to the serving cell only when the CSG cell is an accessible CSG cell.

At this time, if the PCI of the CSG cell is in the range of the PCIs reserved for use by the CSG cells and in the CSG cell list of the UE 300, the UE 300 determines that the corresponding CSG cell is an accessible cell.

Meanwhile, even though the case that the best cell among the measured cells on another frequency band (the second frequency band, F2) fulfills the inter-frequency measurement events and the PCI of the best cell is in the range of the PCIs reserved for use by the CSG cells, if the best cell is a non-accessible CSG cell, the UE 300 does not transmit the inter-frequency measurement report to the serving cell.

In an exemplary embodiment of the present invention, the measurement report method can be applied to the cell reselection procedure as well as the handover procedure. The cell reselection procedure is performed when a UE having no dedicated channel moves from one cell to another. During the cell reselection procedure, the UE 300 measures the received signal strengths of neighbor cells, reports the measurement result, and performs the cell selection/reselection. The cell reselection is performed for the purpose to discover the best cell to camp on. The cell reselection procedure is performed with the measurement report method according to an exemplary embodiment of the present invention.

A measurement report method according to an exemplary embodiment of the present invention is described hereinafter.

Figure 4:
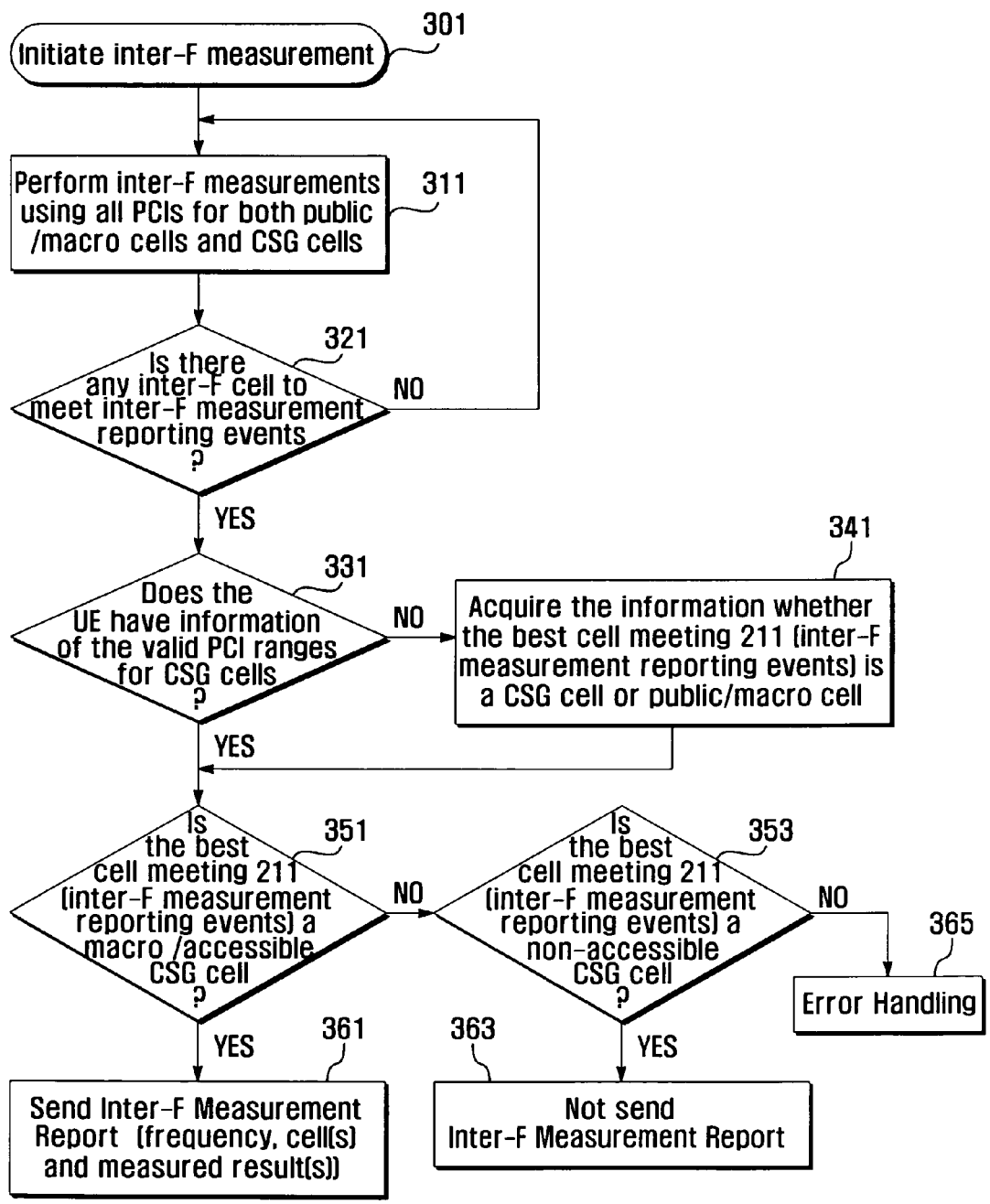
FIG. 4 illustrates a flowchart for a measurement report method according to an exemplary embodiment of the present invention.

FIG. 4 illustrates a flowchart for a measurement report method according to an exemplary embodiment of the present invention.

Referring to FIG. 4, the UE 300 initiates the inter-F measurement on a specific frequency band (block 301).

Once the inter-F measurement is initiated, the UE 300 performs the inter-F measurements using all PCIs for both public/macro cells and CSG cells (block 311). Unlike the measurement procedure for the normal inter-frequency handover, the UE 300 performs the inter-F measurements using all the PCIs including PCIs reserved for use by the CSG cells in the inter-frequency measurement procedure according to an exemplary embodiment of the present invention.

Next, the UE 300 determines whether at least one cell fulfilling the inter-F measurement report events (block 321). As aforementioned, there are two the inter-F measurement report events: first, the measurement of a neighbor cell is greater than the measurement of the serving cell over as much as a predetermined parameter value (offset); and second, the measurement of the neighbor cell is greater than a predetermined threshold.

If there is at least one cell fulfilling the inter-F measurement report events, the process goes to block 321 and, otherwise, returns to block 311.

If there is at least one cell fulfilling the inter-F measurement report events, the UE 300 determines whether the UE 300 has the information on the PCI ranges reserved for use by the CSG cells (block 331). As aforementioned, a range of the PCIs of all the PCIs are reserved for use by the CSG cells.

If the UE 300 has the information on the range of the PCIs reserved for use by the CSG cells at step 331, the UE 300 determines whether the best cell fulfilling the inter-F measurement report events is a macro cell or an accessible CSG cell (block 351). Whether the corresponding cell is an accessible cell can be determined using the information on the range of the PCIs reserved for use by the CSG cells.

In case that there is a cell with which the UE 300 is registered, if the PCI of the cells belongs to the PCIs in the range reserved for use by the CSG cells and is contained in the CSG cell list (white-list) of the UE 300, the UE 300 determines that the CSG cell is an accessible cell. Meanwhile, in case that there is no registered cell, all the CSG cells of which PCIs are in the range reserved for use by the CSG cells are inaccessible cells.

If the UE does not have the information on the range of the PCIs for use by the CSG cells at block 331, the UE 300 acquires the information on the best cell which fulfills the inter-F frequency measurement report events to determine whether the best cell fulfilling the inter-F frequency measurement report events is a CSG cell or a public/macro cell (block 341).

If the best cell fulfilling the inter-F measurement report events is a macro cell or an accessible CSG cell at step 351, the UE 300 transmits the inter-F frequency measurement report to the serving base station (block 361).

The Inter-F frequency measurement report includes the frequency information and at least one PCI, and the measurement value mapped to at least one PCI.

Otherwise, if the best cell fulfilling the inter-F measurement report events is neither a macro cell nor an accessible CSG cell at block 351, the UE determines whether the best cell fulfilling the inter-F measurement report events is a non-accessible cell (block 353). If the best cell fulfilling the inter-F measurement report events is non-accessible cell, the UE 300 does not transmit the inter-F measurement report to the serving cell (block 363). Otherwise, if the best cell fulfilling the inter-F measurement report events is not a non-accessible cell, the UE 300 performs an error handling process (block 365).

In short, assuming that the best cell fulfilling the inter-F measurement report events on the second frequency band (F2) is a "valid" cell, the UE determines whether to transmit the inter-frequency measurement report, in consideration of the type of the valid cell, range of the PCIs reserved for use by CSG cells, and whether the CSG cell is registered.

First, if the valid cell is a macro cell or an accessible CSG cell, the UE transmits the inter-frequency measurement report to the serving base station 205. Otherwise, if the valid cell is a non-accessible, i.e. not registered, CSG cell, the UE 300 does not transmits the inter-frequency measurement report to the serving base station.

Second, in case that the UE 300 has no registered cell (i.e., the CSG cell list is empty) and knows the range of the PCIs for use by CSG cells, the UE 300 transmits the inter-frequency measurement report to the serving eNB only if the PCI of the valid cell is not in the range of the PCIs reserved for use by CSG cells. Otherwise, if the PCI of the valid cell is in the range of the PCIs reserved for use by CSG, the UE 300 does not sends the inter-frequency measurement report to the serving base station. If the UE does not know the range of the PCIs reserved for use by CSG cells, the UE 300 can determines whether the corresponding cell is a CSG cell, based on the system information received from the valid cell.

Third, in case that at least one accessible CSG cell with which the UE 300 is registered is contained in the CSG cell list and the UE 300 knows the range of the PCIs for use by the CSG cells, the UE transmits the inter-F measurement report to the serving base station only when the PCI of the valid cell out of the range of the PCIs reserved for use by CSG cells or the valid cell is an accessible cell even though the PCI of the valid cell is in the range of the PCIs reserved for use by CSG cells. If the PCI of the valid cell is in the range of the PCIs reserved for use by CSG cells and also contained in the CSG cell list of the UE 300, the UE 300 determines that the CSG cell is an accessible CSG cell. Otherwise, if the PCI of the valid cell is in the range of the PCIs reserved for use by CSG cells but not contained in the CSG cell list of the UE 300, the UE 300 regards the valid cell as an inaccessible cell and does not transmit the inter-frequency measurement report to the serving cell.

Figure 5:
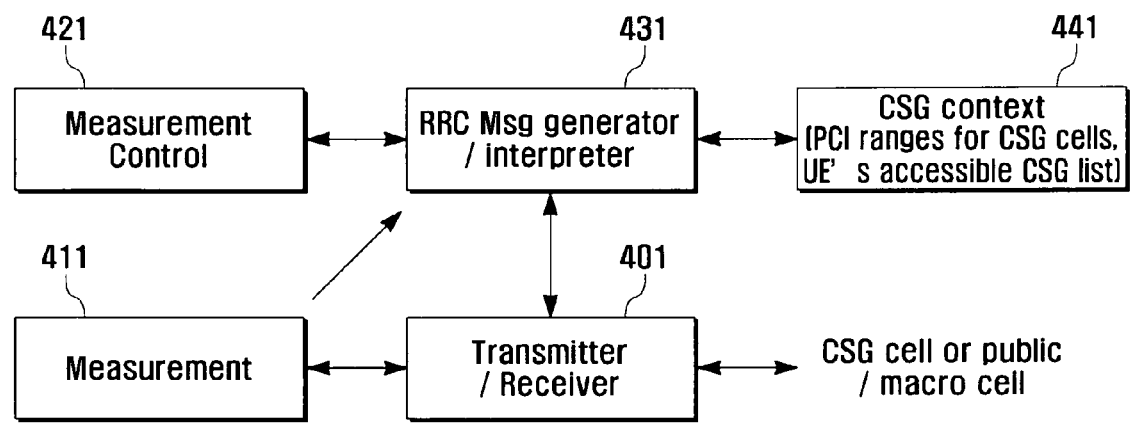
FIG. 5 illustrates a block diagram for a configuration of a UE for supporting the measurement report method according to an exemplary embodiment of the present invention.

A structure of the UE for supporting the measurement report procedure according to the exemplary embodiments of the present invention is described hereinafter. FIG. 5 illustrates a block diagram for a configuration of a UE for supporting the measurement report method according to an exemplary embodiment of the present invention.

As shown in FIG. 5, the UE includes a transceiver 401, a measurement unit 410, a measurement controller 421, an RRC message generator/interpreter 431, and a CSG context storage unit 441.

The transceiver 401 is responsible for transmission and reception of the control information and data to and from the CSG cell and macro cell.

The measurement unit 411 performs the intra-frequency and inter-frequency measurements. That is, the measurement unit 411 is configured to be able to perform measurements of the neighbor cells. Here, the measurements include the received signal strength measurement of the neighbor cells.

The measurement controller 421 controls the measurement unit 411 to perform the inter-frequency measurements. The measurement controller 421 provides the information on the target frequency band to measure and gap between the frequency bands. That is, the measurement controller 421 stores the information on the conditions for triggering the inter-frequency measurement and inter-frequency measurement report events and parameters, and controls the measurement unit 411 to perform the inter-frequency measurement based on this information. The inter-frequency measurement report events are follows: first the measurement on a neighbor cell is greater than the measurement of the serving cell over as much as a predetermined parameter value (offset) and, second, the measurement of the neighbor cell is greater than a predetermined threshold.

When an inter-frequency measurement condition is fulfilled, the measurement controller 421 controls the measurement unit 411 to perform the inter-frequency measurement and determines whether the measurement result fulfills the inter-frequency measurement report events.

The RRC message generator/interpreter 431 generates an inter-frequency measurement report message and sends the inter-frequency measurement report message to the serving base station by means of the transceiver 401.

The CSG context storage unit 441 stores the information on the range of the PCIs reserved for use by CSG cells and the CSG cell list (e.g., white-list) containing the accessible CSG cells that are preregistered.

The RRC message generator/interpreter 431 determines whether to report the inter-frequency measurement provided by the measurement unit 411 to the serving base station. The reporting of the inter-frequency measurement provided with reference to the information on the range of the PCIs reserved for use by CSG cells and the CSG cell list containing the accessible CSG cells that are preregistered.

That is, the RRC message generator/interpreter 431 refers to the information stored in the CSG context storage unit 441. The RRC message generator/interpreter 431 determines whether to transmit the inter-frequency measurement report in consideration of the existence of the information on the range of the PCIs reserved for use by CSG cells and, if the target cell is a CSG cell, whether the PCI of the target cell is contained in the CSG cell list. The RRC message generator/interpreter 431 transmits the inter-frequency measurement report to the serving base station depending on the determination result.

The cell of which measurement is the best among the measurements of neighbor cells that are measured on the second frequency (F2) in an inter-frequency measurement procedure and fulfills the inter-frequency measurement report events is called a valid cell.

First, the RRC message generator/interpreter 431 determines to transmit the inter-frequency measurement report when the valid cell is a macro cell RO an accessible cell with which the UE 300 is registered. The RRC message generator/interpreter 431 determines not to transmit the inter-frequency measurement report when the valid cell is a non-accessible CSG cell.

Second, in case that there is no CSG cell with which the UE 300 is registered and the range of the PCIs reserved for use by CSG cells is known, the RRC message generator/interpreter 431 determines to transmit the inter-frequency measurement report to the serving cell only when the PCI of the valid cell is out of the range of the PCIs reserved for use by CSG cells. Otherwise, if the PCI of the valid cell is in the range of the PCIs reserved for use by CSG cells, the RRC message generator/interpreter 431 determines not to transmit the inter-frequency measurement report to the serving base station.

In case that the range of the PCIs reserved for CSG cells is not know, the UE can determines whether the valid cell is a CSG cell, based on the system information received from the valid cell.

Third, in case that at least one accessible CSG cell with which the UE 300 is registered is contained in the CSG cell list and the UE 300 knows the range of the PCIs for use by the CSG cells, the RRC message generator/interpreter 431 determines to transmit the inter-F measurement report to the serving base station only when the PCI of the valid cell is out of the range of the PCIs reserved for use by CSG cells or the valid cell is an accessible cell even though the PCI of the valid cell is in the range of the PCIs reserved for use by CSG cells.

At this time, if the PCI of the valid cell is in the range of the PCIs reserved for use by CSG cells and also contained in the CSG cell list of the UE 300, the RRC message generator/interpreter 431 determines that the valid cell is an accessible CSG cell. Otherwise, if the PCI of the valid cell is in the range of the PCIs reserved for use by CSG cells but not contained in the CSG cell list of the UE 300, the RRC message generator/interpreter 431 regards the valid cell as an inaccessible cell.

Therefore the the RRC message generator/interpreter 431 does not transmit the inter-frequency measurement report to the serving cell.

Here, the RRC message generator/interpreter 431 can determine whether the valid cell is an accessible CSG cell by referencing the range of the PCIs reserved for use by CSG cells.

In case that there is at least one registered cell, if the PCI of the valid cell is in the range of the PCIs reserved for use by CSG cells and also contained in the CSG cell list (white-list), the RRC message generator/interpreter 431 regards the CSG cell as an accessible CSG cell. In case that there is no registered cell, the cells of which PCIs are in the range of the PCIs reserved for use by CSG cells are regarded as non-accessible cells.

If it is determined to transmit the inter-frequency measurement report, the RRC message generator/interpreter 431 generates the inter-frequency measurement report message and transfers the inter-frequency measurement report message to the transceiver 401. The transceiver 401 transmits the inter-frequency measurement report message to the serving base station.

As described above, the measurement report method and apparatus of the present invention is capable of skipping transmission of unnecessary measurement report to the serving network, thereby avoiding ping-pong effect caused by unnecessarily repetition of handovers, resulting in enhancement of network performance.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An inter-frequency measurement report method of a user equipment in a wireless communication system including macro and Closed Subscriber Group (CSG) cells, the method comprising:

performing measurements for Physical Cell Identifiers (PCIs) used for a macro cell and a CSG cell comprising an accessible CSG cell and a non-accessible CSG cell when measurement for inter-frequency handover is performed;

determining whether a measurement of at least one cell fulfills an inter-frequency measurement report event;

in response to at least one cell fulfilling the inter-frequency measurement report event, identifying a cell type of a best cell having a greatest received signal strength among at least two cells fulfilling the inter-frequency measurement report event;

transmitting, only if the best cell is a macro cell or an accessible CSG cell, the inter-frequency measurement report to a serving base station; and if the best cell is not the non-accessible CSG cell, performing an error handling process.

2. The inter-frequency measurement report method of claim 1, further comprising determining the best cell as the accessible CSG cell if the user equipment has at least one registered CSG cell and the best cell is one of the at least one registered CSG cell; and a PCI in a range of the PCIs reserved for use by CSG cells.

3. The inter-frequency measurement report method of claim 1, further comprising skipping, if the best cell is a non-accessible CSG cell, transmission of the inter-frequency measurement report to the serving cell.

4. The inter-frequency measurement report method of claim 3, further comprising determining, if the user equipment has no registered CSG cell and the PCIs of the best cell is out of a range of the PCIs reserved for use by CSG cells, the best cell as the non-accessible CSG cell.

5. The inter-frequency measurement report method of claim 1, further comprising determining if a user equipment includes information regarding valid PCI ranges for CSG cells.

6. The inter-frequency measurement report method of claim 5, further comprising: if the user equipment does not include the information regarding valid PCI ranges for the CSG cells, acquiring a second information indicating whether the best cell is the macro cell or the accessible CSG cell.

7. An inter-frequency measurement report apparatus of a user equipment in a wireless communication system including macro and Closed Subscribed Group (CSG) cells, the apparatus comprising:
  a measurement unit configured to perform measurements for cells;
  a measurement controller configured to control the measurement unit to measure Physical Cell Identifiers (PCI) used for a macro cell and a CSG cell comprising an accessible CSG cell and a non-accessible CSG cell when measurement for inter-frequency handover is performed; and
  a message processor configured to select a best cell having a greatest received signal strength among at least two cells having a measurement that fulfills an inter-frequency measurement report event, the message processor configured to check a cell type of the best cell, and generate, only when the best cell is a macro cell or an accessible CSG cell, an inter-frequency measurement report message to be transmitted to a serving cell, wherein the message processor error handling process if the best cell is not the non-accessible CSG cell.

8. The inter-frequency measurement report apparatus of claim 7, wherein the message processor determines the best cell as the accessible CSG cell if the user equipment has at least one registered CSG cell and the best cell is one of: the at least one registered cell; and a PCI in a range of the PCIs reserved for use by CSG cells.

9. The inter-frequency measurement report apparatus of claim 7, wherein the message processor skips, if the best cell is a non-accessible CSG cell, creation of the inter-frequency measurement report message.

10. The inter-frequency measurement report apparatus of claim 9, wherein the message processor determines, if the user equipment has no registered CSG cell and the PCIs of the best cell is out of a range of the PCIs reserved for use by CSG cells, the best cell as the non-accessible CSG cell.

11. The inter-frequency measurement report apparatus of claim 7, wherein the message processor determines if a user equipment includes information regarding valid PCI ranges for CSG cells.

12. The inter-frequency measurement report apparatus of claim 11, wherein the message processor acquires a second information indicating whether the best cell is the macro cell or the accessible CSG cell if the user equipment does not include the information regarding valid PCI ranges for the CSG cells.

13. A mobile terminal for use in a wireless communication system including macro and Closed Subscribed Group (CSG) cells, the mobile terminal comprising:
  a transceiver;
  a measurement unit configured to perform measurements for cells;
  a measurement controller configured to control the measurement unit to measure all cells identified by unique Physical Cell Identifiers (PCI) used for a macro cell and a CSG cell comprising an accessible CSG cell and a non-accessible CSG cell when measurement for inter-frequency handover is performed; and
  an RRC message generator/interpreter configured to select a best cell having a greatest received signal strength among at least two cells having a measurement that fulfills an, inter-frequency measurement report event, the RRC message generator/interpreter configured to:
  determine whether the best cell is a macro cell or an accessible CSG cell;
  generate, only when the best cell is a macro cell or an accessible CSG cell, an inter-frequency measurement report message; and
  transmit, via the transceiver, the inter-frequency measurement report to a serving cell, wherein the RRC message generator/interpreter performs an error handling process if the best cell is not the non-accessible CSG cell.

14. The mobile terminal of claim 13, wherein the RRC message generator/interpreter determines the best cell as the accessible CSG cell if the user equipment has at least one registered CSG cell and the best cell is one of: the at least one registered cell and a PCI in a range of the PCIs reserved for use by CSG cells.

15. The mobile terminal of claim 13, wherein the RRC message generator/interpreter skips, if the best cell is a non-accessible CSG cell, creation of the inter-frequency measurement report message.

16. The mobile terminal of claim 15, wherein the RRC message generator/interpreter determines, if the user equipment has no registered CSG cell and the PCIs of the best cell is out of a range of the PCIs reserved for use by CSG cells, the best cell as the non-accessible CSG cell.

17. The mobile terminal of claim 13, wherein the RRC message generator/interpreter determines if a user equipment includes information regarding valid PCI ranges for CSG cells.

18. The mobile terminal of claim 17, wherein the RRC message generator/interpreter acquires a second information indicating whether the best cell is the macro cell or the accessible CSG cell if the user equipment does not include the information regarding valid PCI ranges for the CSG cells.

* * * * *